US010769696B2

(12) United States Patent
Surana et al.

(10) Patent No.: US 10,769,696 B2
(45) Date of Patent: Sep. 8, 2020

(54) ECOMMERCE SYSTEM WITH EVALUATION OF BOOLEAN EXPRESSION SETS

(71) Applicant: ORACLE INTERNATIONAL CORPORATION, Redwood Shores, CA (US)

(72) Inventors: Ashish Surana, Watertown, MA (US); Charles Trowbridge, Marblehead, MA (US); Ivan Yee-Hang Cheng, Vancouver (CA); Sumesh Poduval, Billerica, MA (US); Thomas P. Scott, Newton, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1013 days.

(21) Appl. No.: 14/928,346

(22) Filed: Oct. 30, 2015

(65) Prior Publication Data
US 2017/0124620 A1    May 4, 2017

(51) Int. Cl.
G06Q 30/06 (2012.01)

(52) U.S. Cl.
CPC ..... G06Q 30/0625 (2013.01); G06Q 30/0603 (2013.01)

(58) Field of Classification Search
CPC ............ G06Q 30/0625; G06Q 30/0603
See application file for complete search history.

(56) References Cited

U.S. PATENT DOCUMENTS 7,120,623 B2 * 10/2006 Ganesan .......... G06F 17/30439
7,406,592 B1   7/2008 Polyudov 2011/0225038 A1    9/2011 Fontoura et al.
2014/0012879 A1 *  1/2014 Hamada .......... G06F 17/30483
                                                 707/780
2016/0103923 A1 *  4/2016 Thomas .............. G06F 40/117
                                                 715/234
2017/0053223 A1 *  2/2017 Kothari .............. G06Q 10/063

OTHER PUBLICATIONS

M. Fontoura et al., "Efficiently Evaluating Complex Boolean Expressions", Yahoo! Research, 701 First Ave., Sunnyvale, CA 94089, http://theory.stanford.edu/~sergei/papers/sigmod10-index.pdf.
3.6 Boolean Expressions, Oracle® OLAP DMP Reference, 10g Release 1 (10.1), Part No. B10339-02 https://docs.oracle.com/cd/B12037_01/olap.101/b10339/expression006.htm.
CIS587: The RETE Algorithm, http://cis-linux1.temple.edu/~giorgio/cis587/readings/rete.html.
S. Whang et al., "Indexing Boolean Expressions", Yahoo! Research, Santa Clara, CA, https://theory.stanford.edu/~sergei/papers/vldb09-indexing.pdf.

* cited by examiner

Primary Examiner — Mark D Featherstone
Assistant Examiner — Faezeh Forouharnejad
(74) Attorney, Agent, or Firm — Potomac Law Group, PLLC

(57) ABSTRACT

A system that evaluates Boolean expressions receives a first set of Boolean expressions that include one or more Boolean expressions, and receives a second set of Boolean expressions that includes one or more Boolean expressions. The system determines one or more overlapping Boolean expressions between the first set and the second set. Each Boolean expression has a corresponding identifier and priority, and two or more Boolean expressions overlap when the Boolean expressions have an identical identifier. Each set of Boolean expressions includes a corresponding index.

20 Claims, 13 Drawing Sheets

ECOMMERCE SYSTEM WITH EVALUATION OF BOOLEAN EXPRESSION SETS

FIELD

One embodiment is directed generally to a computer system, and in particular to an ecommerce computer system that evaluates Boolean expressions.

BACKGROUND INFORMATION

A Boolean expression is a logical statement that is either true or false. Boolean expressions can compare data of any type as long as both parts of the expression have the same basic data type. Boolean expressions allow for the testing of data to see if it is equal to, greater than, or less than other data.

A Boolean expression includes Boolean data, such as Boolean values (YES and NO, and their synonyms, ON and OFF, and TRUE and FALSE), Boolean variables or formulas, functions that yield Boolean results and Boolean values calculated by comparison operators. For example, with the Boolean expression shown below, each value of the variable "actual" is compared to the constant 20,000. If the value is greater than 20,000, then the statement is true; if the value is less than or equal to 20,000, then the statement is false.

Actual GT 20000

There are many applications that use and compare Boolean expressions of features to find matching attributes. For example, online content publishing applications may select lists of advertisements that match a user visit profile associated with a web page for display with content requested by a user. Similarly, electronic commerce ("ecommerce") applications may select a list of products that match the attributes of product information requested by a user and may also select a list of advertisements that match the attributes of product information requested by a user. Further, online search advertising applications may select a list of advertisements that match the user visit profile associated with a web page for display with search results requested by a user. For any of these online applications, Boolean expressions of features may need to be evaluated given an input assignment of features.

SUMMARY

One embodiment is a system that evaluates Boolean expressions. The system receives a first set of Boolean expressions that include one or more Boolean expressions, and receives a second set of Boolean expressions that includes one or more Boolean expressions. The system determines one or more overlapping Boolean expressions between the first set and the second set. Each Boolean expression has a corresponding identifier and priority, and two or more Boolean expressions overlap when the Boolean expressions have an identical identifier. Each set of Boolean expressions includes a corresponding index.

DETAILED DESCRIPTION

One embodiment is an electronic commerce ("ecommerce") computer system that evaluates sets of Boolean expressions that may overlap. The evaluation includes modifying sets of Boolean expressions, merging multiple sets of Boolean expressions, and providing information to assist in understanding the behavior of Boolean expressions.

Figure 1:
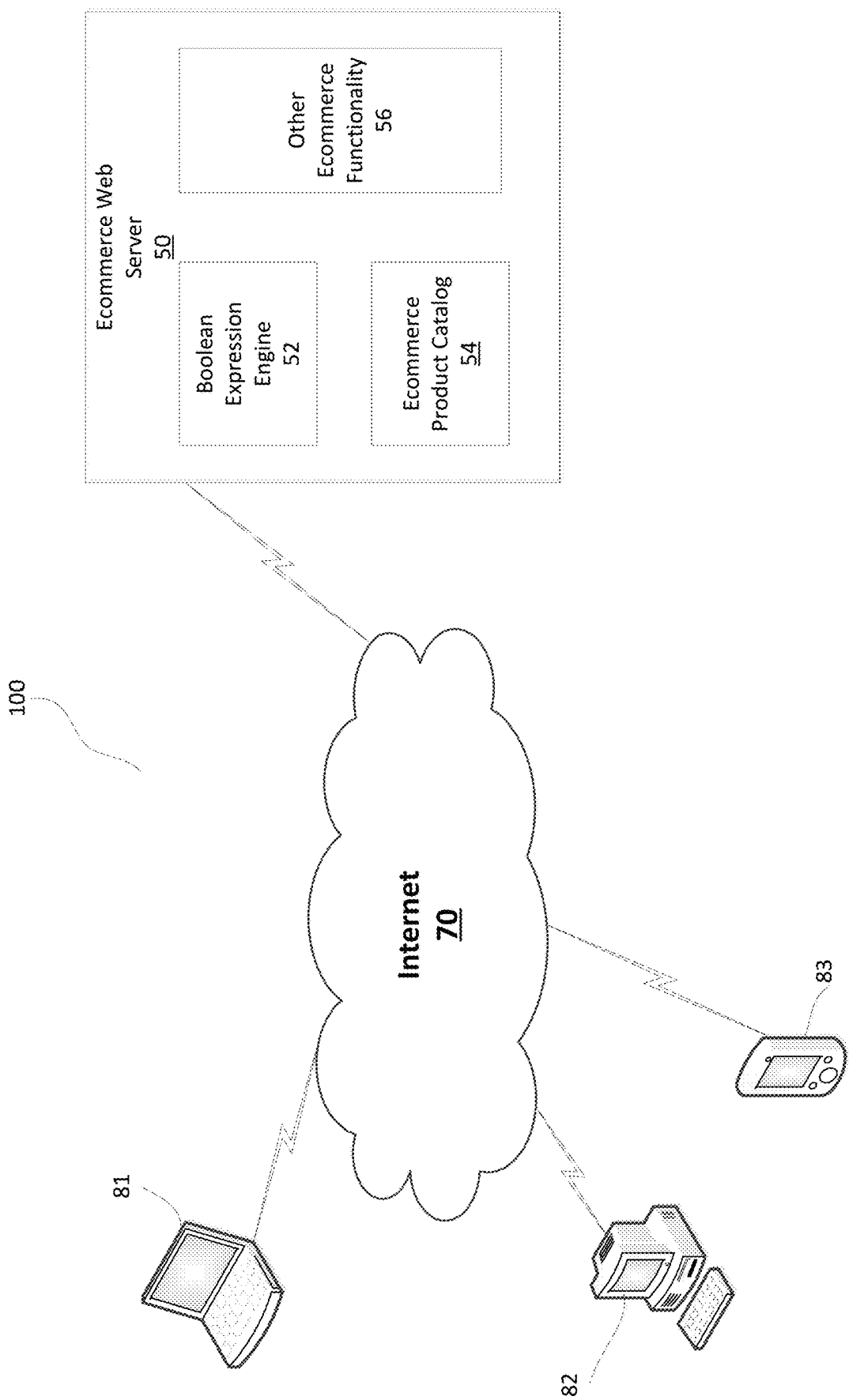
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes end user devices 81-83 in communication with an ecommerce web server 50 over the Internet 70 or any other type of communications network. The end user devices include a laptop computer 81, a desktop computer 82 and a smartphone 83. However, any device that can connect to a web site over a network using a web browser or some other means can be used. End user devices 81-83 and web server 50 may communicate with each other using well-known communication protocols, such as Transmission Control Protocol ("TCP") and Internet Protocol ("IP"), or TCP/IP, HTTP and Extensible Markup Language ("XML").

One embodiment involves evaluating sets of Boolean expressions at an ecommerce web site. That embodiment is illustrated in FIG. 1, where an ecommerce web server 50 provides the ecommerce functionality to a user on an end user device. The ecommerce functionality includes providing an ecommerce product catalog that stores information of all products available to view or purchase on the ecommerce web site. The information may include a description of the product, the price of the product, the inventory level of the product, a picture of the product, etc. Other ecommerce functionality 56 includes all other known ecommerce functionality, such as a shopping cart, a product recommendation generator, a product search engine including search refinements, etc. Finally, ecommerce web server 50 includes a Boolean expression engine 52 that evaluates sets of Boolean expressions as disclosed below in order to perform ecommerce functionality.

In one embodiment, Boolean expression engine 52 is provided as an application programming interface ("API"). An API is a collection of software functions and procedures, referred to as "API calls", that can be executed by other software applications. Application developers can include links to existing APIs in an application to make use of their functionality. This link is generally seamless and end users of the application are typically not aware that a separately developed API is being invoked. Therefore, Boolean expression engine 52 can provide the evaluation of sets of Boolean expressions to any other usage in addition to ecommerce through calls to the API.

In one embodiment, Boolean expression engine 52 is implemented as a Java-based application that includes multiple "methods" that can be called through the API. A method is a set of code which is referred to by name and can be called (invoked) at any point in a program simply by utilizing the method's name, similar to a subroutine. Each method has its own name. When that name is encountered in a program, the execution of the program branches to the body of that method. When the method is finished, execution returns to the area of the program code from which it was called, and the program continues on to the next line of code.

In one embodiment, an ecommerce web page is formed of components that can be referred to as slots and cartridges. Slots function as placeholders in pages where customized content can be stored. A cartridge can reference a slot, which is an equivalent of a JavaServer Pages ("JSP") page requesting content from a slot. Each cartridge type has a property that references the slot to use when retrieving content for the page where the cartridge has been placed. In general, for an ecommerce web page, a shopper sees pages and content on the website that is dynamically assembled from complex, far-reaching rule sets, that include Boolean expressions. This can seem like a "black box" to the business user who works on the website pages using a management tool. Rules-driven page assembly in accordance with embodiments leads to highly dynamic websites with a large number of distinct shopper experiences. This can be overwhelming to manage. These non-technical business users cannot understand the provenance of the dynamically generated content when viewed from the perspective of the final assembled page. This presents an obstacle to effective page authoring and troubleshooting of unexpected page content.

Figure 2:
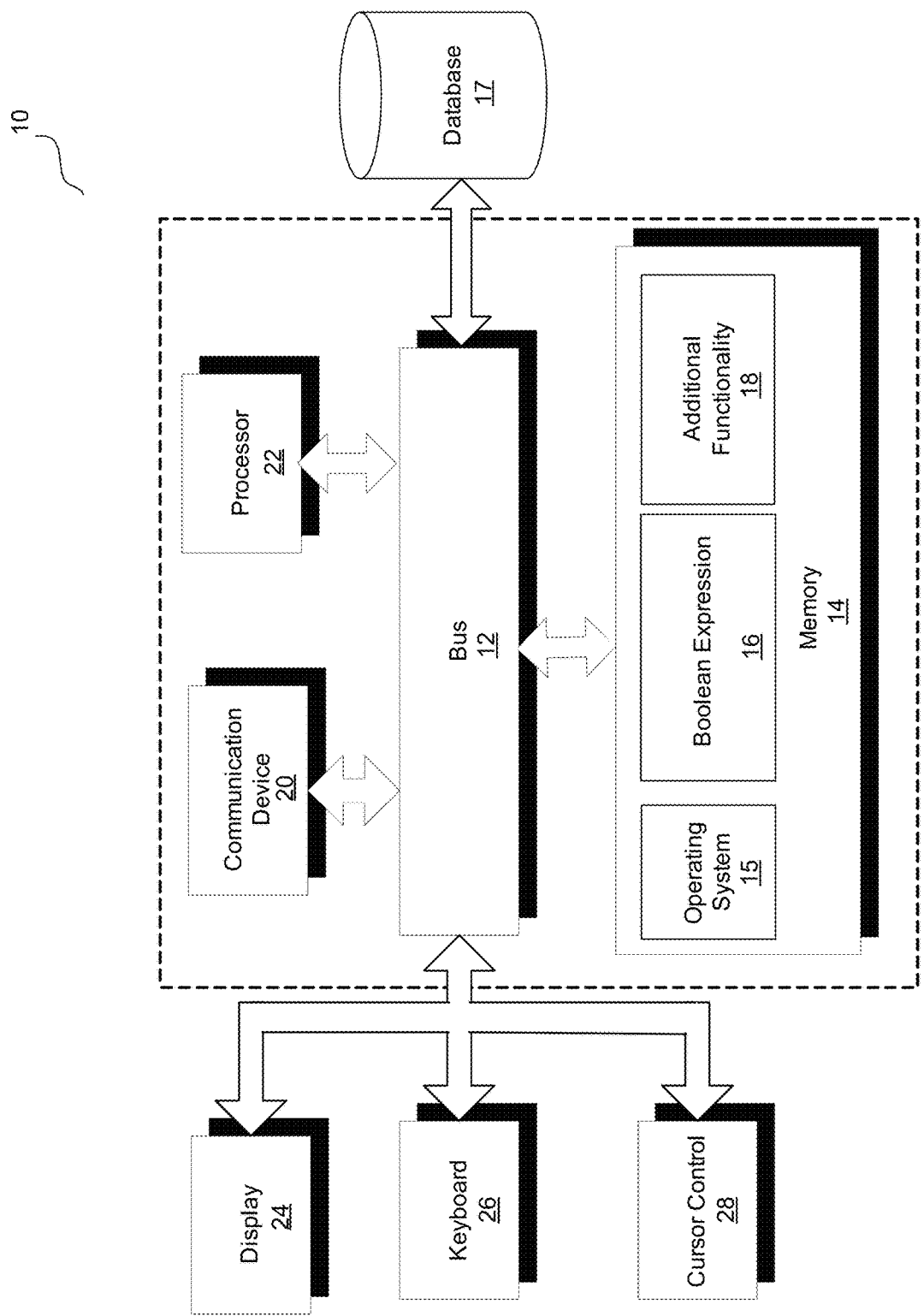
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of ecommerce web server 50 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a Boolean expression module 16 for providing functionality evaluating sets of Boolean expressions, and all other functionality disclosed herein. In one example embodiment, Boolean expression module 16 may implement Boolean expression engine 52 of FIG. 1 in conjunction with one or more remaining elements of FIG. 2. System 10 can be part of a larger system, such as ecommerce web server 50 of FIG. 1. Therefore, system 10 can include one or more additional functional modules 18 to include the additional functionality, including ecommerce product catalog 54 and other ecommerce functionality 56. A database 17 is coupled to bus 12 to provide centralized storage for Boolean expression module 16 and additional functional modules 18. In one embodiment, additional functional modules 18 implement "Oracle Commerce Guided Search" from Oracle Corp.

As described, a Boolean expression is a logical statement that is either TRUE or FALSE. Boolean expressions can compare data of any type as long as both parts of the expression have the same basic data type. Data can be tested to determine if it is equal to, greater than, or less than other data.

A Boolean expression "set" is a collection of unique Boolean expressions. The uniqueness of Boolean expressions in one embodiment is determined using an identifier ("ID") provided by a user when creating each Boolean expression (i.e., a unique ID). If the intersection of two Boolean expression sets is not an empty set, then they are considered overlapping sets.

For example, Table 1 below illustrates a first set or the "mainline" set of Boolean expressions, and Table 2 below illustrates a secondary set of Boolean expressions, which can be used as a "project-specific" or "user-specific" set of Boolean expressions:

TABLE 1

| ID | Boolean Expression | Priority | Payload |
|---|---|---|---|
| 100 | (A EQUALS 10 AND B NOT_EQUALS "someString" AND C GREATER_THAN 100) | 10 | Payload100 |

TABLE 1-continued

| ID | Boolean Expression | Priority | Payload |
|---|---|---|---|
| 101 | (A EQUALS 10 AND B NOT_EQUALS "someString") | 20 | Payload101 |
| 102 | (A EQUALS 10) | 100 | Payload102 |

TABLE 2

| ID | Boolean Expression | Priority | Payload |
|---|---|---|---|
| 100 | (C GREATER_THAN 100 AND D LESS_THAN 500) | 10 | Payload100' |
| 103 | (W LESS_THAN_EQUALS 1000) | 200 | Payload103 |

As shown above, each Boolean expression has an associated ID, a priority, and a payload. A payload is the value returned to the API user when the associated Boolean expression is satisfied. The priority of a Boolean expression denotes how that Boolean expression ranks among other Boolean expressions in its set. While evaluating a Boolean expression set, expressions with higher priority (i.e., a higher ranking) take precedence over the ones with lower priority (i.e., a lower ranking). The "mainline" set is the primary set of Boolean expressions. The mainline set is "special", because all of the Boolean expressions in the mainline set are implicitly included in the secondary sets. This implicit inclusion of mainline Boolean expressions in the secondary sets allows the secondary sets to override a mainline Boolean expression.

Therefore, between the mainline Boolean expression set (Table 1) and the second Boolean expression set (Table 2), Boolean expression 100 is overlapping. As in this example, an overlapping Boolean expression must have the same ID as one of the Boolean expressions in the mainline set. The overlapping Boolean expression can completely redefine the mainline expression (i.e., a different expression), and can have different priority and payload. Two or more Boolean expressions overlap if they have the same ID but their Boolean expressions are different.

Embodiments include "dynamic" Boolean expression sets, which are modifiable collections of unique Boolean expression sets. A dynamic Boolean expression set allows Boolean expressions to be added, and allows Boolean expressions to be updated/removed by using their unique ID.

Embodiments provide for the evaluation of dynamic overlapping sets of Boolean expressions. The evaluation includes the ability to maintain dynamic overlapping isolated sets. Isolation means that Boolean expressions in one set can be updated/deleted/created without affecting Boolean expressions in other sets. The evaluation further provides the ability to audit and evaluate Boolean expressions among the selected sets and return the top-N matching Boolean expressions, as ranked by their priority, where "N" is an integer. Embodiments further provide for the auditing of the Boolean expression sets, including providing information to a user about why a Boolean expression did not evaluate to TRUE.

Figure 3:
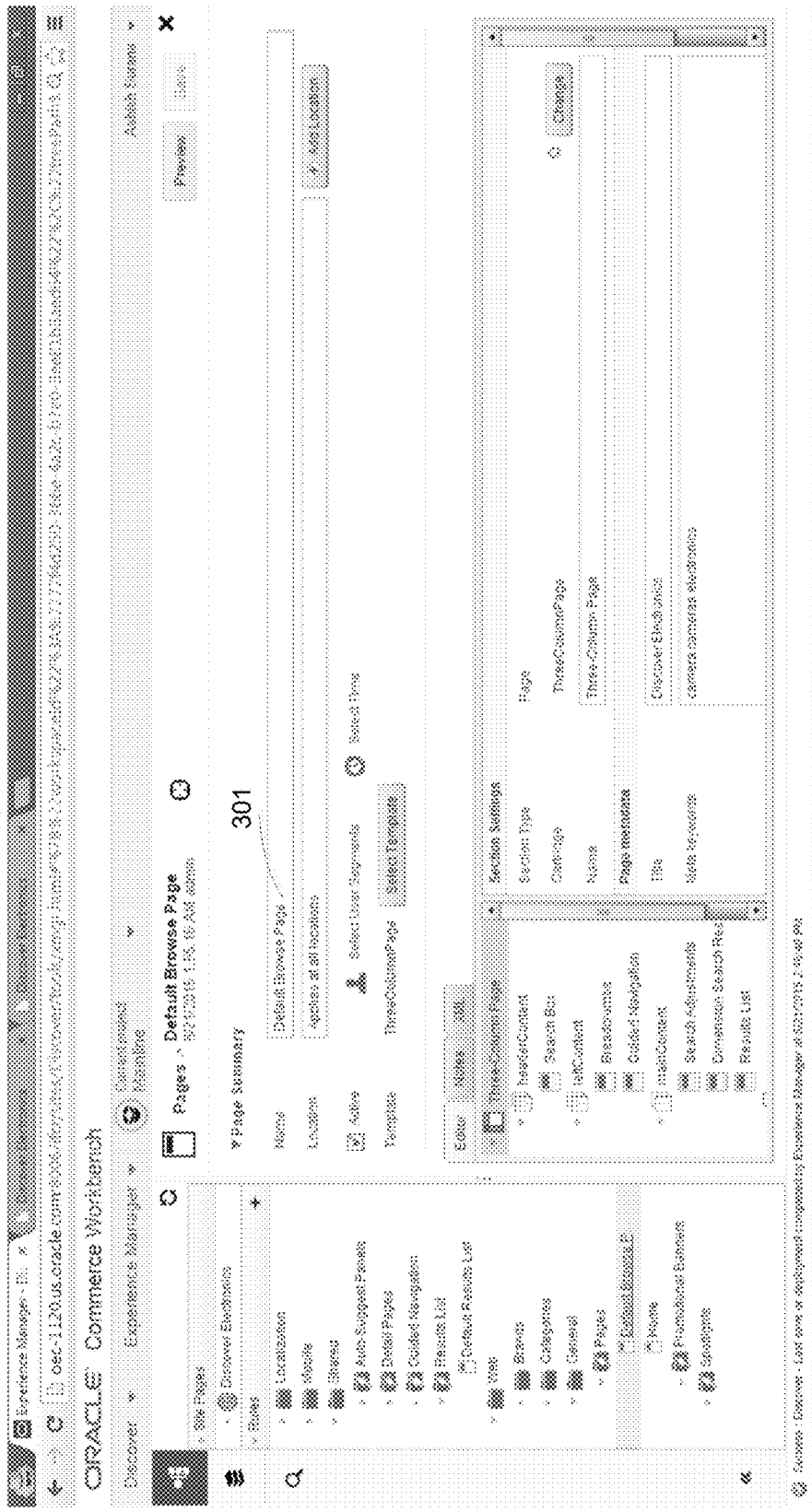
FIG. 3 illustrates a screenshot of a user interface for generating an example Boolean expression in accordance with one embodiment.

In one embodiment, ecommerce web server 50 provides a user interface that allows a user to generate new Boolean expressions that are evaluated by Boolean expression engine 52. FIG. 3 illustrates a screenshot 300 of a user interface for generating an example Boolean expression in accordance with one embodiment. At 301, "default browse page" indicates the Boolean expression is true no matter which web page the user is currently browsing. Therefore, the Boolean expression always evaluates to true.

Figure 4:
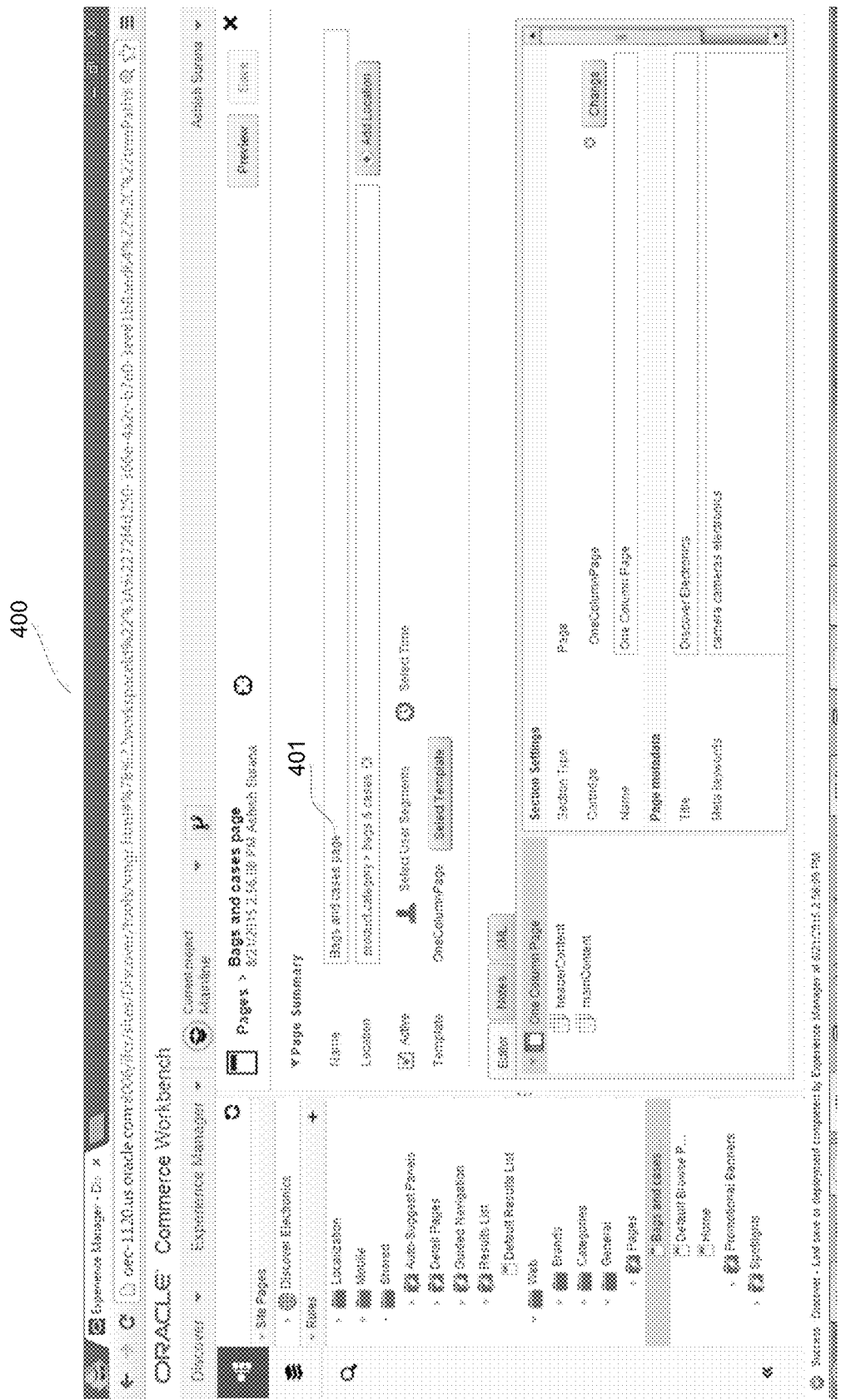
FIG. 4 illustrates a screenshot of a user interface for generating an example Boolean expression in accordance with one embodiment.

FIG. 4 illustrates a screenshot 400 of a user interface for generating an example Boolean expression in accordance with one embodiment. At 401, "bags and cases page" indicates the Boolean expression is true when a user is browsing the web page showing bags and cases.

Figure 5:
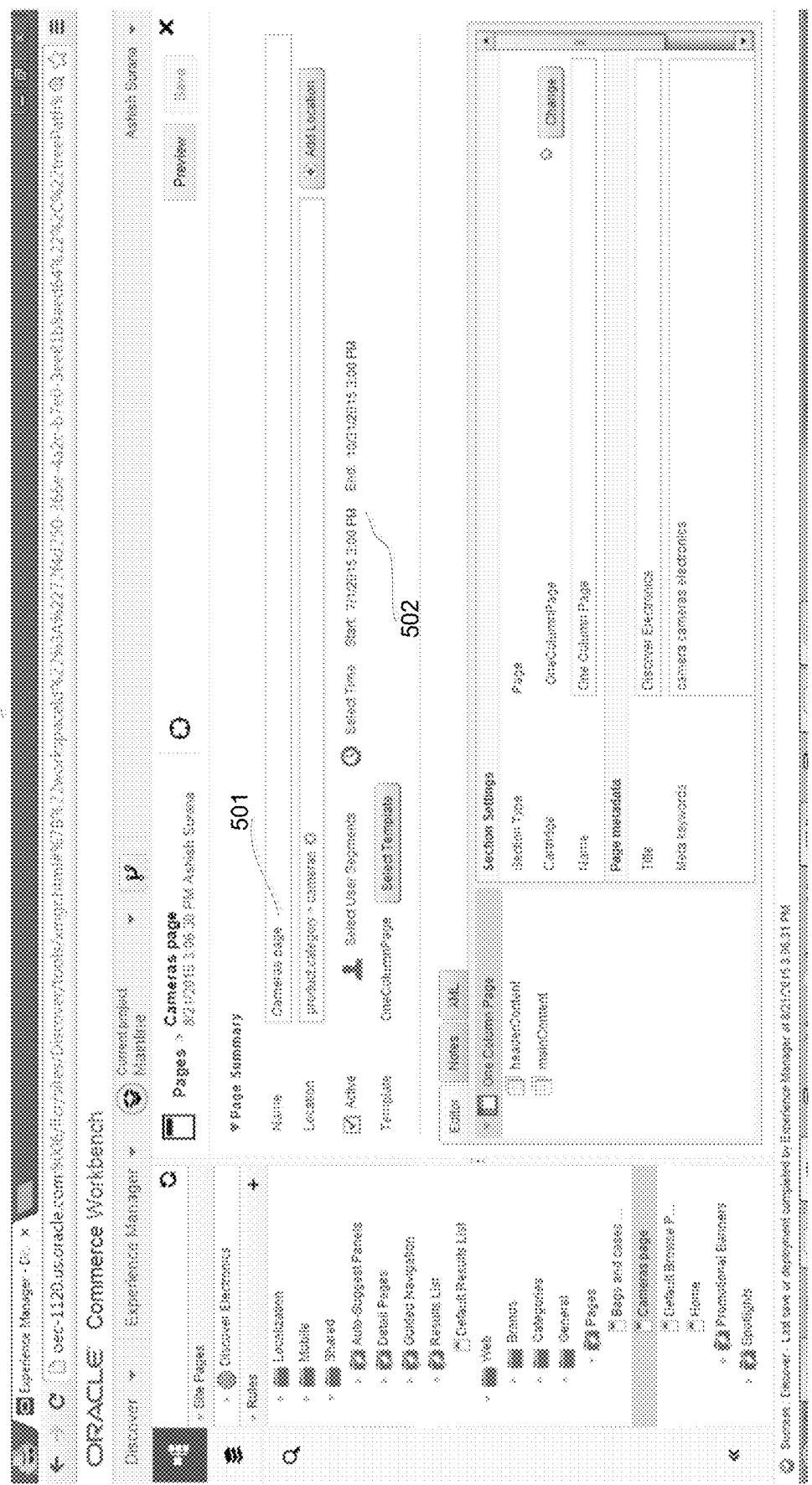
FIG. 5 illustrates a screenshot of a user interface for generating an example Boolean expression in accordance with one embodiment.

FIG. 5 illustrates a screenshot 500 of a user interface for generating an example Boolean expression in accordance with one embodiment. At 501, "Cameras page" indicates the Boolean expression is true when a user is browsing cameras AND as indicate at 502, when the browsing occurs between Jul. 1, 2015 and Oct. 31, 2015.

Figure 6:
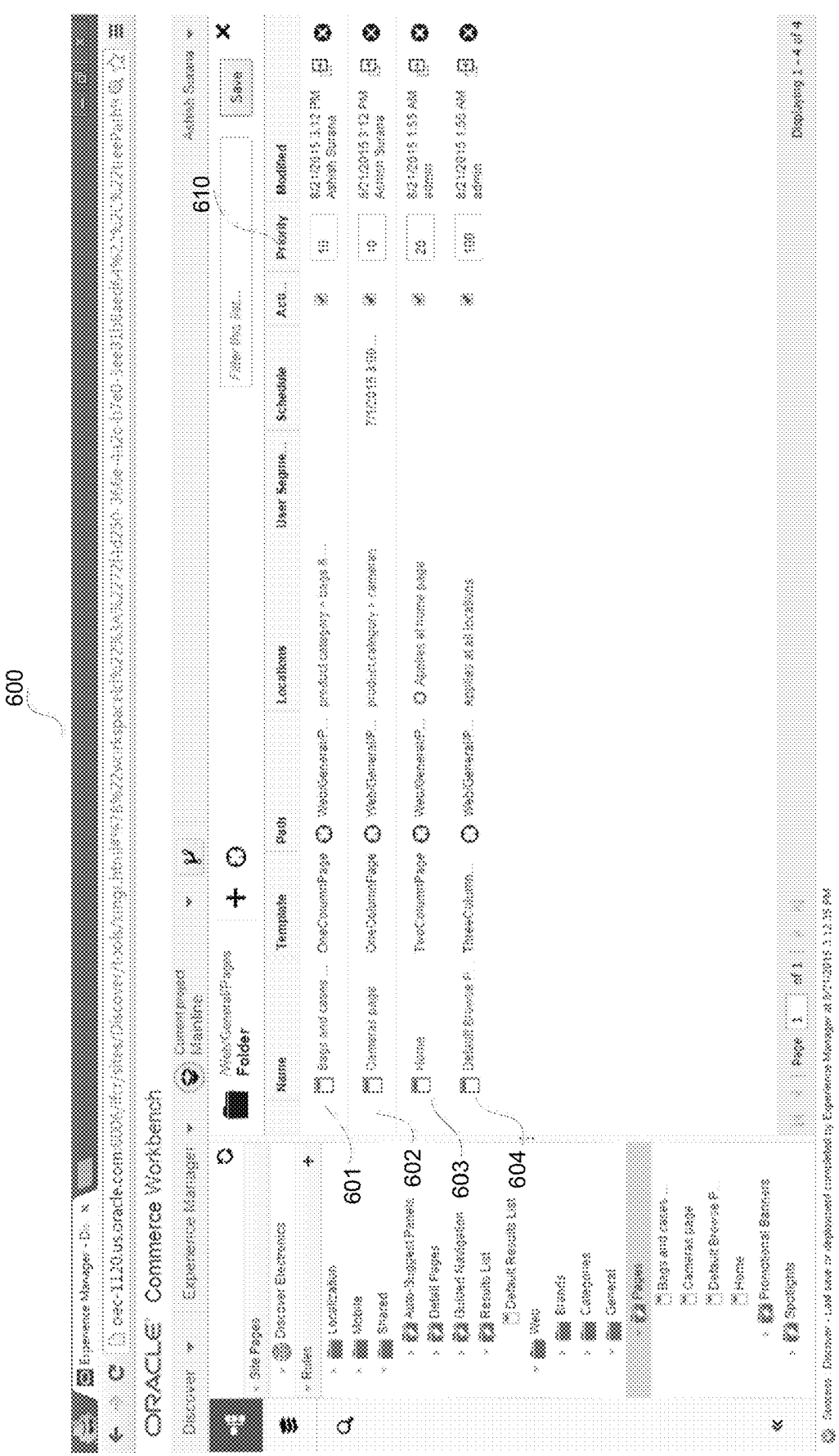
FIG. 6 illustrates a screenshot of a user interface for setting priorities of Boolean expressions in accordance with one embodiment.

FIG. 6 illustrates a screenshot 600 of a user interface for setting priorities of Boolean expressions in accordance with one embodiment. FIG. 6 shows four Boolean expressions 601-604, and a priority column 610 that is used to set a priority for each Boolean expression. A Boolean expression with a priority of 10 (e.g., Boolean expression 601) ranks higher than a Boolean expression with a priority of 11 or more (e.g., a priority of 100 for Boolean expression 604). Therefore, if both of these BEs were satisfied by given facts, then the top-1 expression will be the Boolean expression with a priority of 10 (e.g., Boolean expression 601).

Figure 7:
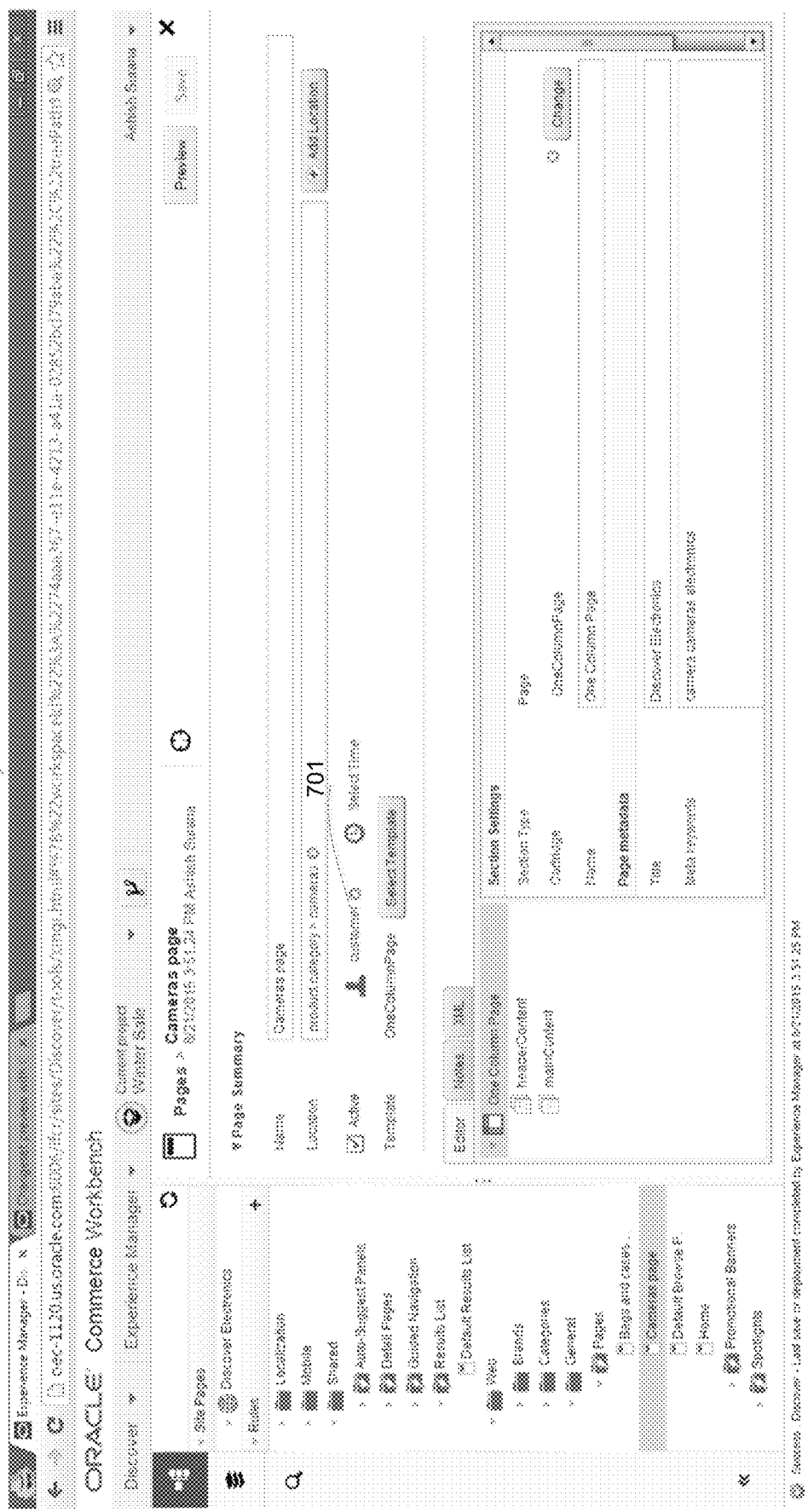
FIG. 7 illustrates a screenshot of a user interface for overlapping Boolean expressions in accordance with one embodiment.

FIG. 7 illustrates a screenshot 700 of a user interface for overlapping Boolean expressions in accordance with one embodiment. FIG. 7 shows a Boolean expression that overlaps the Boolean expression shown in FIG. 5 (i.e., the mainline Boolean expression). As indicated at 701, the time restrictions of the Boolean expression of FIG. 5 are overridden if the user is on the camera page, and if the user is a registered customer.

Figure 8:
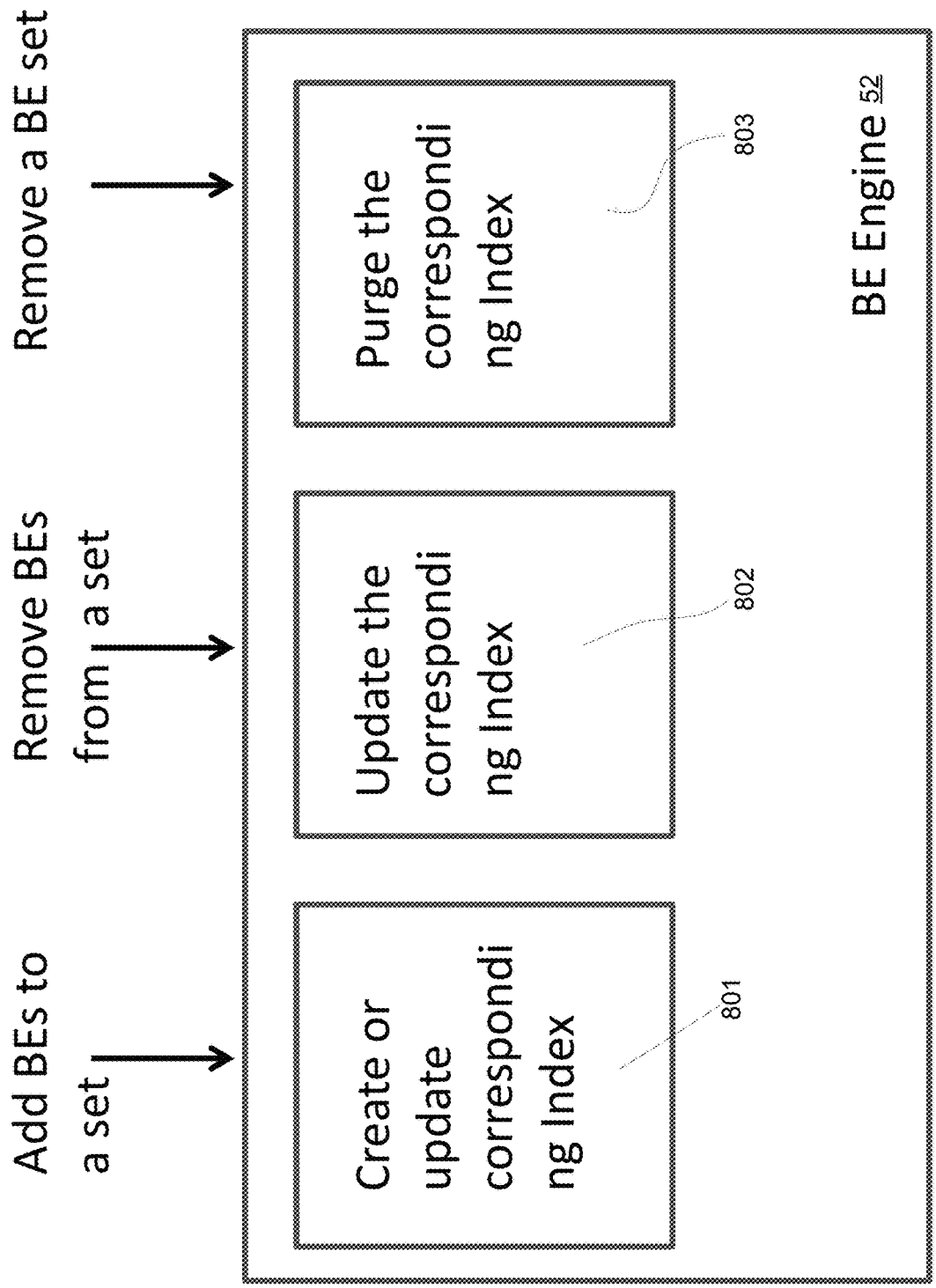
FIG. 8 is a flow diagram of the Boolean expression engine of FIG. 1 and/or the Boolean expression module of FIG. 2 when defining, updating and removing Boolean expression sets in accordance with embodiments of the present invention.

FIG. 8 is a flow diagram of Boolean expression engine 52 of FIG. 1 and/or Boolean expression module 16 of FIG. 2 when defining, updating and removing Boolean expression sets in accordance with embodiments of the present invention. In one embodiment, the functionality of the flow diagram of FIG. 8 (and FIG. 9 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 801, in response to a request via the API to add Boolean expressions to a set, the corresponding index is created or updated. At 802, in response to a request via the API to remove Boolean expressions from a set, the corresponding index is updated. At 803, in response to a request via the API to remove a Boolean expression set, the corresponding index is purged. Boolean expressions are denormalized and stored into indexes using an internal data structure described in detail below. Indexes provide a fast and efficient way of auditing and evaluating the top-N Boolean expressions in a set. Each Boolean expression set includes a corresponding index.

Figure 9:
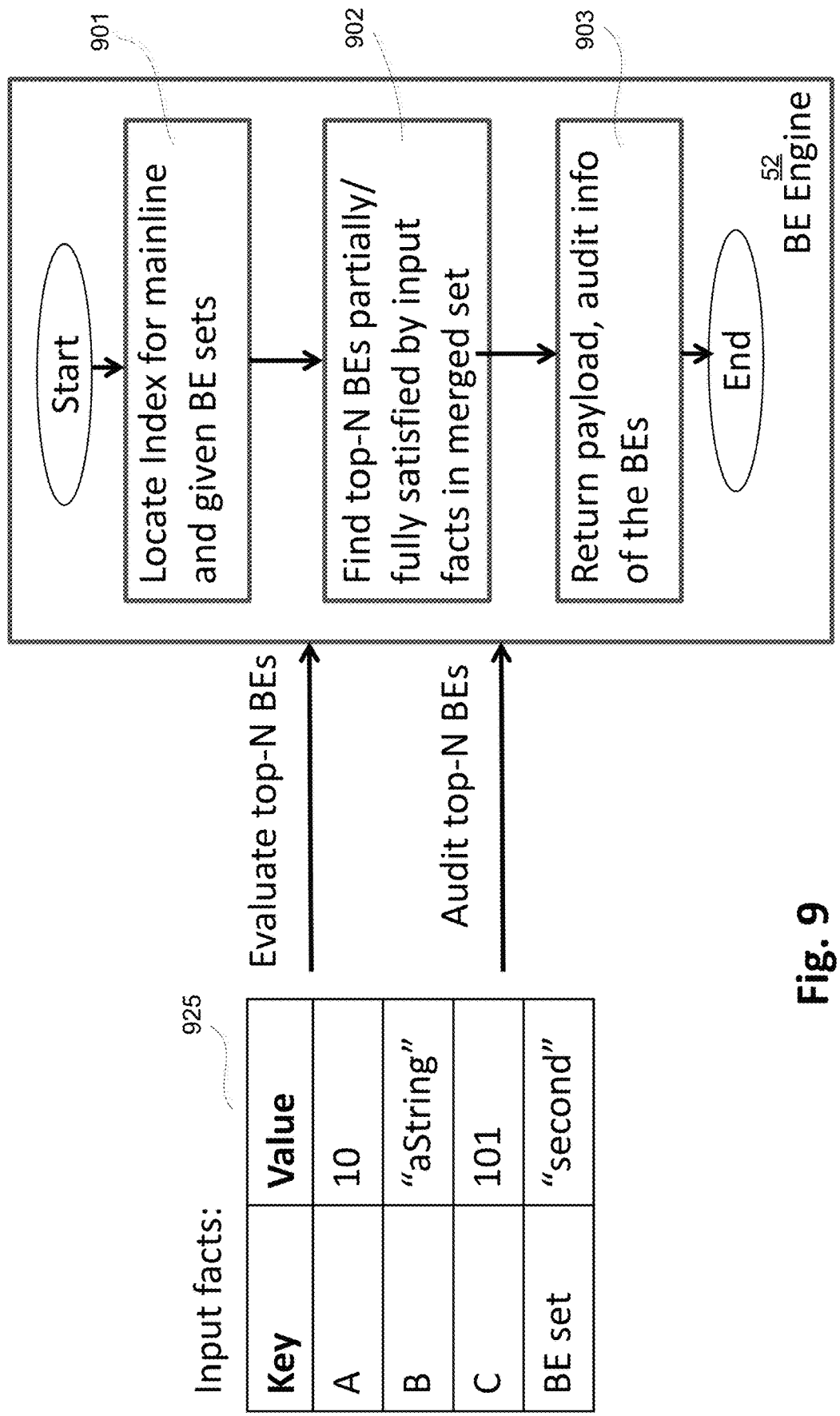
FIG. 9 is a flow diagram of the Boolean expression engine of FIG. 1 and/or the Boolean expression module of FIG. 2 when evaluating and auditing Boolean expressions in accordance with embodiments of the present invention.

FIG. 9 is a flow diagram of Boolean expression engine 52 of FIG. 1 and/or Boolean expression module 16 of FIG. 2 when evaluating and auditing Boolean expressions in accordance with embodiments of the present invention.

In the example of FIG. 9, input facts 925 are received. Input facts 925 included keys and values. A "key" is a variable name in the Boolean expression. A "value" is the variable value in the Boolean expression. In response to input facts 925, at 901 the index is located for the mainline set and the given Boolean expression sets (i.e., the secondary Boolean expression sets). At 902, the top-N Boolean expressions partially or fully satisfied by input facts 925 in a merged set are determined. For example, out of over one million Boolean expressions, only the top-10 may be shown and evaluated. At 903, the payload and audit information of the Boolean expressions are returned. Further, embodiments can rank and return partially satisfied Boolean expressions in addition to fully satisfied expressions, where the ranking can be determined by a static priority, a dynamic calculation of percentage of expression matching, or a combination of each.

Figure 10:
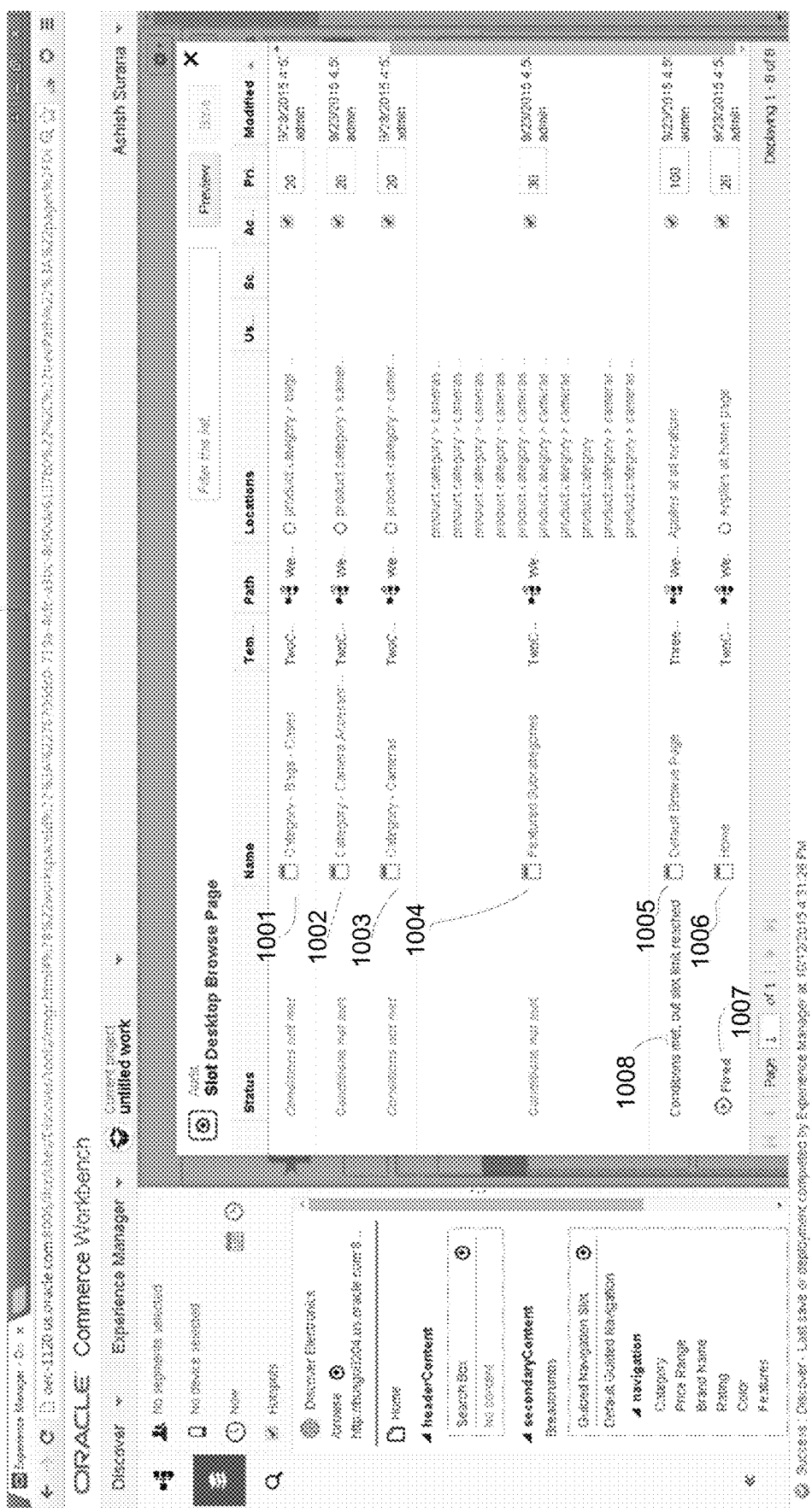
FIG. 10 illustrates a screenshot of a user interface of the result of returned payload and audit information of the top-N Boolean expressions in accordance with one embodiment.

FIG. 10 illustrates a screenshot 1000 of a user interface of the result of returned payload and audit information of the top-N Boolean expressions in accordance with one embodiment.

As shown in FIG. 10, six Boolean expressions are shown as Boolean expressions 1001-1006. In the example of FIG. 10, both the "Home" Boolean expression 1006 and the "Default Browse Page" Boolean expression 1005 were satisfied, but the top-1 query used in the example of FIG. 10 returned the "Home" Boolean expression 1006 since it has higher priority than the "Default Browse Page" Boolean expression 1005 and is the only Boolean expression that was satisfied, as indicted by the "fired" status at 1007. In contrast, Boolean expressions 1001-1004 are indicated as "Conditions not met" to indicate that they were only partially satisfied. Similarly, Boolean expression 1005 was satisfied, but it was not returned because Boolean expression 1006 had a higher priority, as indicated by "Conditions met, but slot limit reached" at 1008. In addition to the showing that Boolean expressions 1001-1004 were only partially satisfied, the audit output of FIG. 10 assists the end user in understanding why a Boolean expression was or was not satisfied by the given set of facts, which is determined by embodiments of the invention.

The functionality of FIGS. 8 and 9 provide system users with an ability to modify sets of Boolean expressions, and view the evaluation of those Boolean expressions in isolation from other system users. For example, this may give one set of users, working on a project, the ability to modify a set of Boolean expressions and preview these changes without affecting another group of users. The isolation is achieved by efficient management of those multiple Boolean expression sets. Adding/updating/deleting a Boolean expressions in one set does not affect other sets.

The functionality further provides users with an ability to merge multiple sets of Boolean expressions. For example, one set of users could "commit" their changes such that all groups of users will see their changes. Similarly, two groups of users could merge their changes to form a single set.

The functionality further provides users with an ability to understand Boolean expression evaluation behavior with specific regard to why some Boolean expressions take precedence over others. For example, a particular business user would be able to understand why the results associated with a particular Boolean expression are not appearing within their website.

The following example pseudo-code is for generating a new Boolean expression or "rule" by building a "RuleSet" as shown in FIG. 8 in accordance with one embodiment. A rule set is made up of rules and sorting directives. The rules define the possible matches between items in a repository (i.e., documents) and a user (based on the user's profile attributes). Rules are either accept rules or reject rules. If an accept rule is true with respect to a target object (i.e., a document in the repository), then that target object is included in the targeting results. If a reject rule is true with respect to a target document, then that target object is excluded from the targeting results.

Targeting rules use operators such as "and," "equals," and "includes," to establish relationships between properties of target objects (the documents or other items in the repository) and properties of source objects (such as the profiles of the users). A rule set in one embodiment has the following basic structure:

```
<ruleset>
    <accepts>
        <rule ...> ... </rule>
        ...
    </accepts>
    <rejects>
        <rule ...> ... </rule>
        ...
    </rejects>
    <includes>
        <ruleset src=...> ... </ruleset>
        ...
    </includes>
    <sortby>
        <sortbyvalue ...>
        ...
    </sortby>
    <site type=...>
    </site>
</ruleset>
```

To create a Boolean expression based on data, the "RuleBuilder" class is used. A user would add all the Boolean expressions to a list and pass it on to the RuleSet implementation:

int priority=10; //lower priority value implies higher priority.
RuleBuilder<String> ruleBuilder=new RuleBuilder<String>("myRuleId", priority, "payload_1");
TriggerBuilder triggerBuilder=ruleBuilder.newTriggerBuilder( );
triggerBuilder.addClause("A", EQUALS, 10); // A EQUALS 10
triggerBuilder.addClause("B", NOT_EQUALS, "someString");
triggerBuilder.addClause("C", GREATER_THAN, 100);
triggerBuilder=ruleBuilder.newTriggerBuilder( );
Rule myRule=ruleBuilder.build( );
//Resulting boolean expression for the rule is: (A EQUALS 10 AND B NOT_EQUALS "someString" AND C G List<Rule<String>> rules=new ArrayList<Rule<String>>( );
rules.add(myRule);
RuleSet<String> ruleSet=new RuleSet<String>(rules).

The following example pseudo-code is for generating a new "RuleEvaluator" in accordance with one embodiment. Rules can be evaluated by a RuleEvaluator, which contains an immutable snapshot of the RuleSet. A rule evaluator can be invoked by invoking the appropriate method on the RuleSet disclosed above:
RuleEvaluator<String> ruleEvaluator=ruleSet.getRuleEvaluator( ).

The following example pseudo-code is for asserting facts and getting matching rules/Boolean expressions, as shown in FIG. 9 in accordance with one embodiment. The appropriate method on the RuleEvaluator created above is invoked and the triggered rules are received. The returned list of triggered rules is sorted by ascending order of the rule's priority value:

```
MultiMap facts=new MultiMap<String, Rule.Value>( );
facts.put("key1", new Value(11));
int maxRulesToReturn=1;
List<Rule<String>>
triggedRules=ruleEvaluator.evaluateRules(facts, maxRulesToReturn);
```

Supporting Ranges

Figure 11A:
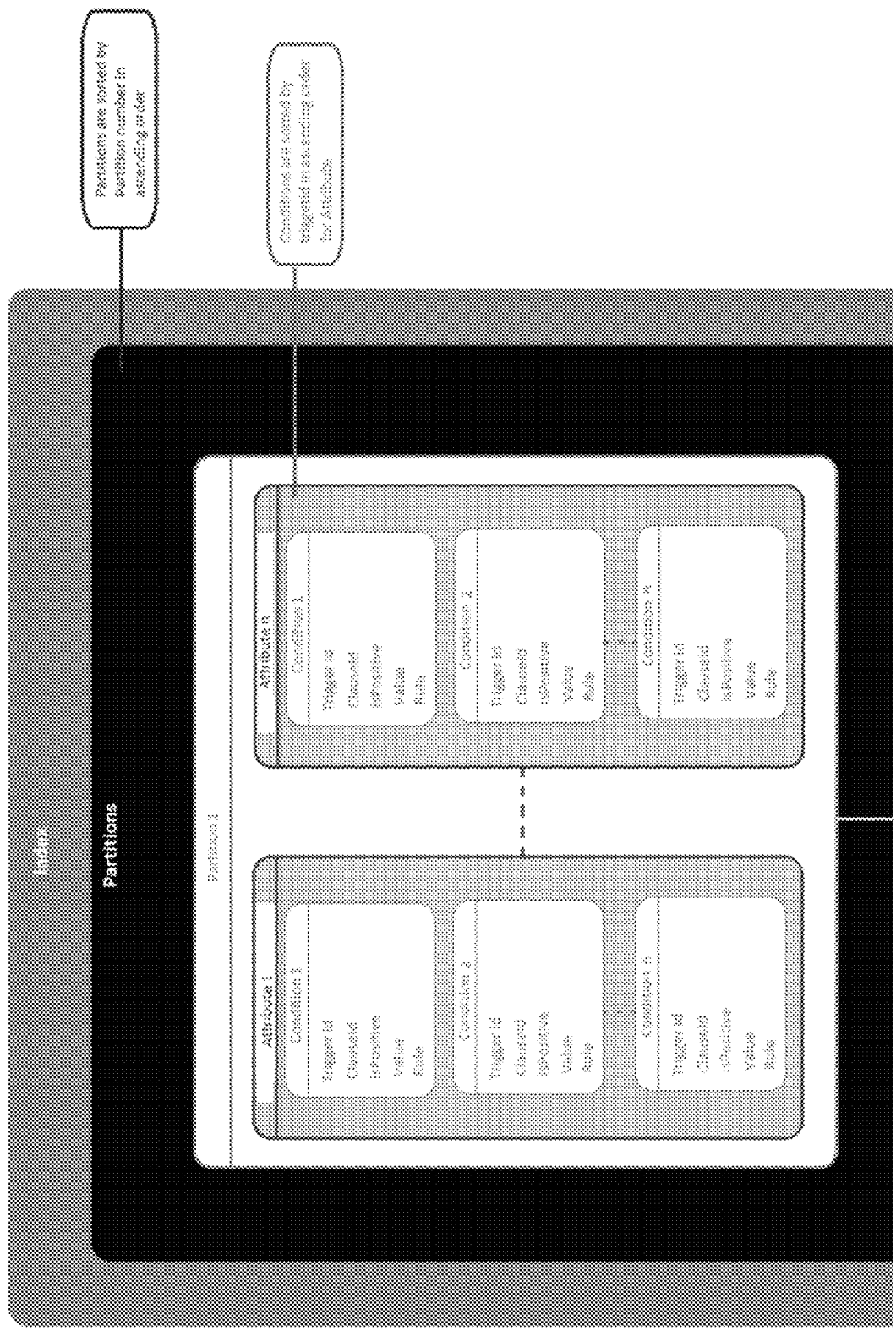
FIGS. 11A-11C illustrate an index diagram for range attributes in accordance to one embodiment.
Figure 11B:
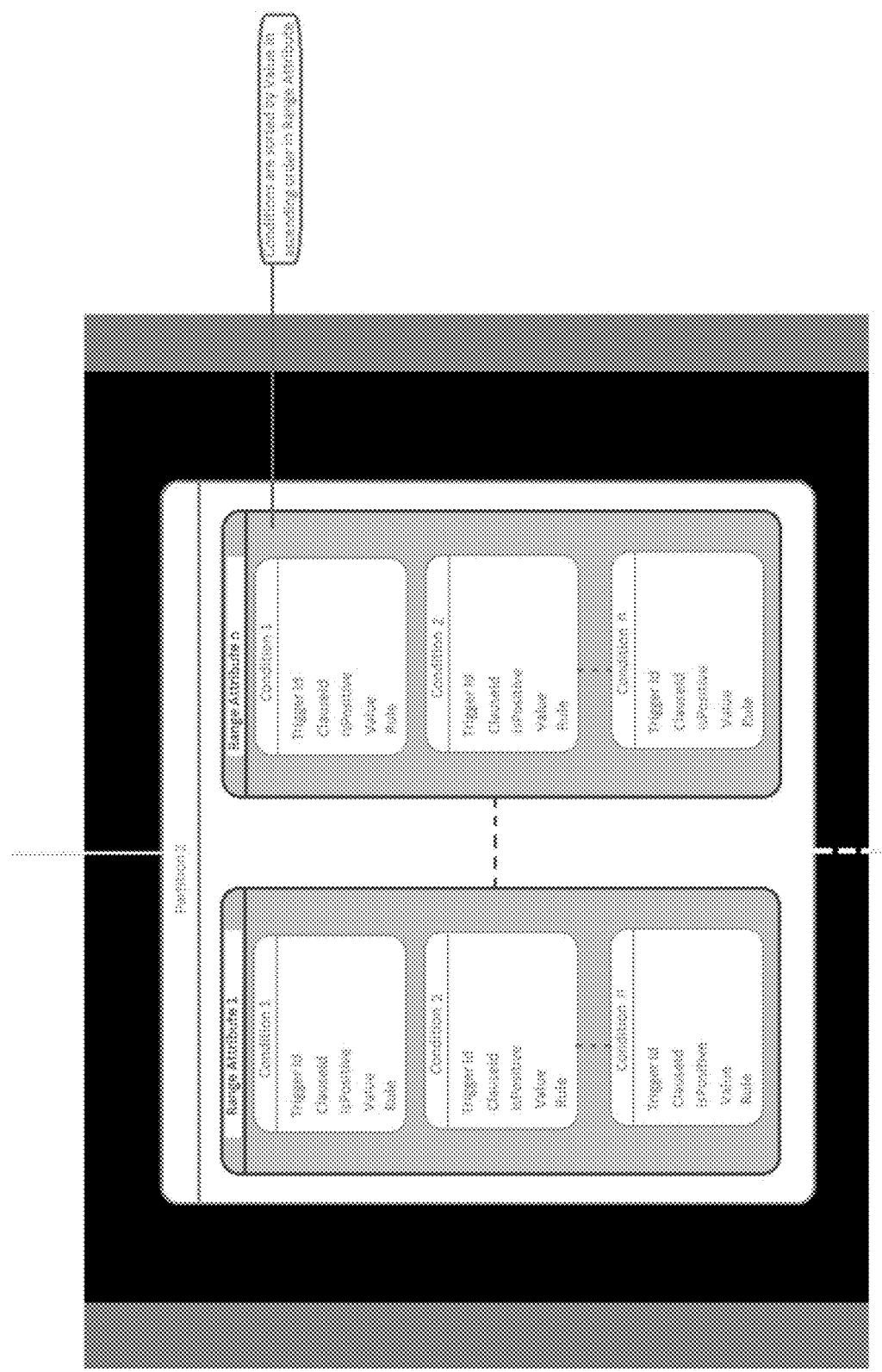
Figure 11C:
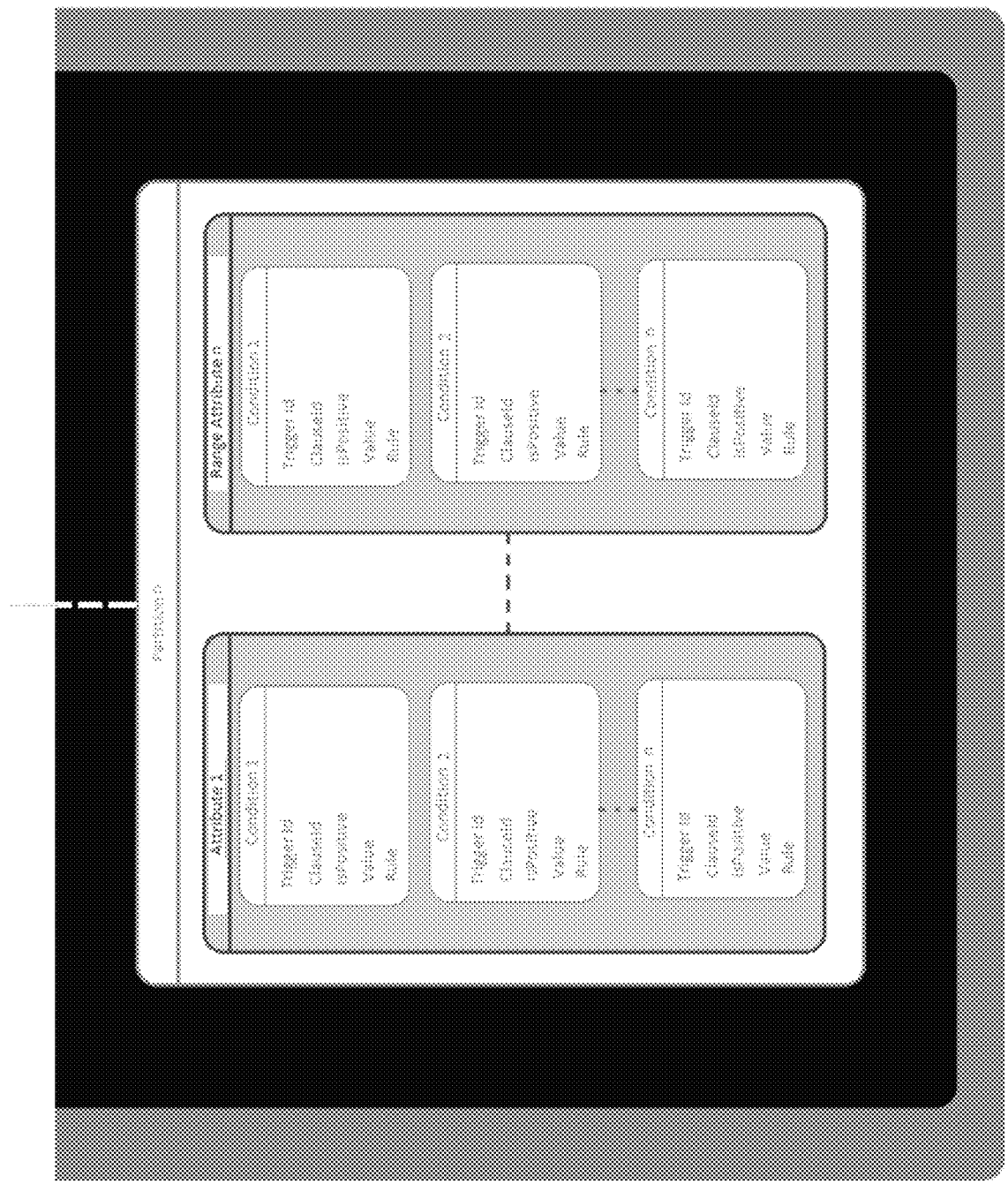

Applications may specify ranges of values in their Boolean expressions. For example "A>3" means the Boolean expression A>3 is satisfied for fact A={4 or 5 or 6 . . . }. One embodiment uses range predictions by efficiently indexing the range using a model. FIGS. 11A-11C illustrate an index diagram for range attributes in accordance to one embodiment. In the model of FIGS. 11A-11C, a range attribute is constructed which maintains a list of conditions, and these conditions are sorted by value in ascending order. For example, consider the following four Boolean expressions shown in Table 3 below and a respective partition number (denoted as "K"). Additional details regarding partitions and condition/conjunction is disclosed in Whang et al., *Indexing Boolean Expressions*, Proceedings of the VLDB Endowment, pp. 37-48 (2009), the disclosure of which is herein incorporated by reference.

TABLE 3

| ID | Expression | K (Partition #) |
| --- | --- | --- |
| c1 | A > 10 ∧ A < 20 | 2 |
| c2 | A > 30 ∧ B > 20 | 2 |
| c3 | A > 20 ∧ B > 20 | 2 |
| c4 | A > 20 ∧ B > 20 ∧ C = 20 | 3 |

Index Construction

During the indexing processing in one embodiment, partitions are created based on a given Boolean expression size. For example, two partitions are created based on Boolean expressions from Table 3 above (i.e., K={2, 3}). The partition with conjunctions of size K is referred to as the "K-index." For each K-index, a posting list of all possible attributes is created. A posting list attribute key for an equal operation is constructed based on an attribute name and operation (e.g., C EQUALS 20). A posting list attribute key for a range operation is constructed based on an attribute name and operation (e.g., A GREATER_THAN). The keys of the posting lists are stored in a hash table, which is used to search posting lists given keys of an assignment. Each entry of the Attribute/Range Attribute represents a sorted list of Conditions. Condition "c" contains the ID of the c, a bit indicating whether the key is involved in an ∈ or ∉ predicate in c, and the value of the c.

For an equal operation attribute, the Condition list is sorted by condition ID in ascending order (i.e., condition with lowest ID at the top of the list and condition with highest ID at the bottom of the list). For a range operation attribute, the Condition list is sorted by condition value in ascending order (i.e., the condition with the lowest value at the top of the list and the condition with highest value at the bottom of the list). Table 4 below shows the indexed Boolean expressions from Table 3 above.

TABLE 4

| K (Partition #) | Attribute | Condition: Value |
| --- | --- | --- |
| 2 | A GREATER_THAN | c1: 10 |
| | | c3: 20 |
| | | c2: 30 |
| | A LESS_THAN | c1: 20 |
| | B GREATER_THAN | c2: 20 |
| | | c3: 20 |
| 3 | A GREATER_THAN | c3: 20 |
| | B GREATER_THAN | c3: 20 |
| | C EQUALS 20 | c3: 20 |

Range Attribute Evaluation

One embodiment returns all the satisfied conditions from Range Attributes for a given fact/assignment using the following functionality. First, a list is constructed of all possible asserted range attribute name and value pair for numeric valued facts (e.g., for fact A=20, the list of asserted range attribute name and value pair are: (A GREATER_THAN, 20), (A GREATER_THAN_OR_EQUALS, 20), (A LESS_THAN, 20), (A LESS_THAN_OR_EQUALS, 20).

Second, embodiments iterate through each element of the asserted range attribute list, and use the key of the asserted range attribute to search for the matching attribute in a respective partition (e.g., search the first asserted attribute key A GREATER_THAN in Partition 2, using Table 4 for the index). The process of retrieving the satisfied condition from the matched attribute varies based on operation as follows:

GREATER_THAN—find the index of condition with value immediate less than [asserted attribute value]. For example, the matching condition index is m, and then retrieve all the conditions from index 0 to m, since the conditions are sorted by value in ascending order (e.g., asserted attribute (A GREATER_THAN, 20) will return only c1 (from Table 4) as a satisfied condition).

GREATER_THAN_OR_EQUALS—find the index of condition with value immediate less than or equals to [asserted attribute value]. For example, the matching condition index is m, and then retrieve all the conditions from index 0 to m, since the conditions are in sorted by value in ascending order.

LESS_THAN—find the index of condition with value immediate greater than [asserted attribute value]. For example, the matching condition index is m, and then retrieve all the conditions from index m to [last index], since the conditions are in sorted by value in ascending order.

LESS_THAN_OR_EQUALS—find the index of condition with value immediate greater than or equal to [asserted attribute value]. For example, the matching condition index is m, then retrieve all the conditions from index m to [last index], since the conditions are in sorted by value in an ascending order.

Once the satisfied condition list for the matching attribute is retrieved, the list is sorted by ID. This will allow the top priority Boolean expressions to be evaluated first.

Evaluate and Retrieve Top N Satisfied Boolean Expressions

For fast retrieval of the Top N Boolean expressions, one embodiment constructs the ID in condition such that its high order bits reflect the priority, and the lower order bits reflect the unique incremental count. This scheme of ID construction allows up to M IDs, where "M" stands for the total number of IDs possible, to be added to a single index:

$$ID=(Priority)*M+(Counter+1) \qquad 5$$

As an example, in order to allow one billion IDs to be added to a single index, ID=(Priority)*1000000000+(Counter+1). The condition list is sorted by ID in ascending order during the indexing process. This allows retrieving the top priority condition first from a matching attribute during evaluation.

As disclosed, embodiments provide for the evaluation over multiple overlapping sets of Boolean expressions, where each set of Boolean expressions includes data operations to add, remove, or update Boolean expressions from all previous sets. Embodiments also include the ability to dynamically add or remove sets, where set updates can be processed atomically. Embodiments further include the ability to rank and return partially satisfied Boolean expressions in addition to fully satisfied expressions, where the ranking can be determined by a static priority, a dynamic calculation of percentage of expression matching, or a combination of each.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to evaluate Boolean expressions to determine a functionality of an ecommerce website, the evaluating comprising:
   receiving a first set of Boolean expressions comprising a first plurality of unique Boolean expressions, each Boolean expression having an associated identifier and payload and comprising a first Boolean expression having an associated first identifier, wherein the payload comprises a value that is returned when a corresponding Boolean expression is satisfied;
   receiving a second set of Boolean expressions, separate from the first set of Boolean expressions, comprising a second plurality of unique Boolean expressions and comprising a second Boolean expression having the associated first identifier, wherein the second Boolean expression is different from the first Boolean expression;
   for a first mode of operation of the ecommerce website, evaluating only the first set of Boolean expressions to dynamically assemble pages and content on the ecommerce website in accordance to the first mode, wherein in the first mode of operation the first Boolean expression is evaluated;
   for a second mode of operation of the ecommerce website, determining one or more overlapping Boolean expressions between the first set and the second set, evaluating any overlapping Boolean expression in the second set of Boolean expressions as a replacement of the corresponding Boolean expression in the first set of Boolean expressions and evaluating the Boolean expressions in the first set that do not have a corresponding overlapping Boolean expression in the second set, to dynamically assemble pages and content on the ecommerce website in accordance to the second mode, wherein in the second mode of operation the second Boolean expression is evaluated instead of the first Boolean expression;
   wherein each Boolean expression has a corresponding identifier and priority, and two or more Boolean expressions overlap when the two or more Boolean expressions each have an identical identifier and the Boolean expressions are different;
   wherein each set of Boolean expressions comprises a corresponding index;
   wherein the evaluating each of the Boolean expressions comprises receiving values for all variables of each Boolean expression and determining whether the Boolean expression is true or false based on the values, wherein at least one of the values is based on a type of products shown on the ecommerce website, and the evaluating of each of the Boolean expressions comprises returning a payload that corresponds to the each Boolean expression when the expression is true to a user of the ecommerce website via an application program interface (API).

2. The computer readable medium of claim 1, further comprising removing a second Boolean expression from the first set in isolation from the second set.

3. The computer readable medium of claim 1, further comprising adding a second Boolean expression to the first set in isolation from the second set.

4. The computer readable medium of claim 1, further comprising removing the second set.

5. The computer readable medium of claim 1, the evaluating further comprising:
   receiving key facts comprising a plurality of key and value pairs;
   determining a top-N Boolean expressions of a merged set of the first set and second set that are partially or fully satisfied by the received key facts, wherein the determined top-N Boolean expressions comprise at least one partially satisfied Boolean expression.

6. The computer readable medium of claim 5, further comprising for each of the top-N Boolean expressions, returning payload and audit information.

7. The computer readable medium of claim 5, wherein the partially satisfied comprises determining a percentage of expression matching.

8. The computer readable medium of claim 1, wherein the index comprises partitions based on sizes of the Boolean expressions.

9. A method for evaluating Boolean expressions to determine a functionality of an ecommerce website, the method comprising:
   receiving a first set of Boolean expressions comprising a first plurality of unique Boolean expressions, each Boolean expression having an associated identifier and payload and comprising a first Boolean expression having an associated first identifier, wherein the payload comprises a value that is returned when a corresponding Boolean expression is satisfied;
   receiving a second set of Boolean expressions, separate from the first set of Boolean expressions, comprising a second plurality of unique Boolean expressions and comprising a second Boolean expression having the associated first identifier, wherein the second Boolean expression is different from the first Boolean expression;
   for a first mode of operation of the ecommerce website, evaluating only the first set of Boolean expressions to dynamically assemble pages and content on the ecommerce website in accordance to the first mode, wherein in the first mode of operation the first Boolean expression is evaluated;

for a second mode of operation of the ecommerce website, determining one or more overlapping Boolean expressions between the first set and the second set, evaluating any overlapping Boolean expression in the second set of Boolean expressions as a replacement of the corresponding Boolean expression in the first set of Boolean expressions and evaluating the Boolean expressions in the first set that do not have a corresponding overlapping Boolean expression in the second set, to dynamically assemble pages and content on the ecommerce website in accordance to the second mode, wherein in the second mode of operation the second Boolean expression is evaluated instead of the first Boolean expression;

wherein each Boolean expression has a corresponding identifier and priority, and two or more Boolean expressions overlap when the two or more Boolean expressions each have an identical identifier and the Boolean expressions are different;

wherein each set of Boolean expressions comprises a corresponding index;

wherein the evaluating each of the Boolean expressions comprises receiving values for all variables of each Boolean expression and determining whether the Boolean expression is true or false based on the values, wherein at least one of the values is based on a type of products shown on the ecommerce website, and the evaluating of each of the Boolean expressions comprises returning a payload that corresponds to the each Boolean expression when the expression is true to a user of the ecommerce website via an application program interface (API).

10. The method of claim 9, further comprising removing a second Boolean expression from the first set in isolation from the second set.

11. The method of claim 9, further comprising adding a second Boolean expression to the first set in isolation from the second set.

12. The method of claim 9, further comprising removing the second set.

13. The method of claim 9, further comprising:
receiving key facts comprising a plurality of key and value pairs;
determining a top-N Boolean expressions of a merged set of the first set and second set that are partially or fully satisfied by the received key facts, wherein the determined top-N Boolean expressions comprise at least one partially satisfied Boolean expression.

14. The method of claim 13, further comprising for each of the top-N Boolean expressions, returning payload and audit information.

15. The method of claim 13, wherein the partially satisfied comprises determining a percentage of expression matching.

16. The method of claim 9, wherein the index comprises partitions based on sizes of the Boolean expressions.

17. An electronic commerce system comprising:
one or more processors;
a storage device coupled to the processor and storing a product catalog, a first set of Boolean expressions comprising a first plurality of unique Boolean expressions, a second set of Boolean expressions comprising a second plurality of unique Boolean expressions, and a Boolean expression evaluation module that comprises instructions;
the processors executing the Boolean expression module and receiving a product information comprising input facts that comprise Boolean expression keys and values and generating an ecommerce website using the product catalog comprising:
receiving thea first set of Boolean expressions comprising the first plurality of unique Boolean expressions, each Boolean expression having an associated identifier and payload and comprising a first Boolean expression having an associated first identifier, wherein the payload comprises a value that is returned when a corresponding Boolean expression is satisfied;
receiving the second set of Boolean expressions, separate from the first set of Boolean expressions, comprising thea second plurality of unique Boolean expressions and comprising a second Boolean expression having the associated first identifier, wherein the second Boolean expression is different from the first Boolean expression;
for a first mode of operation of the ecommerce website, evaluating only the first set of Boolean expressions to dynamically assemble pages and content on the ecommerce website in accordance to the first mode, wherein in the first mode of operation the first Boolean expression is evaluated;
for a second mode of operation of the ecommerce website, determining one or more overlapping Boolean expressions between the first set and the second set, evaluating any overlapping Boolean expression in the second set of Boolean expressions as a replacement of the corresponding Boolean expression in the first set of Boolean expressions and evaluating the Boolean expressions in the first set that do not have a corresponding overlapping Boolean expression in the second set, to dynamically assemble pages and content on the ecommerce website in accordance to the second mode, wherein in the second mode of operation the second Boolean expression is evaluated instead of the first Boolean expression;
wherein each Boolean expression has a corresponding identifier and priority, and two or more Boolean expressions overlap when the two or more Boolean expressions each have an identical identifier and the Boolean expressions are different;
wherein each set of Boolean expressions comprises a corresponding index;
wherein the evaluating each of the Boolean expressions comprises receiving values for all variables of each Boolean expression and determining whether the Boolean expression is true or false based on the values, wherein at least one of the values is based on a type of products shown on the ecommerce website, and the evaluating of each of the Boolean expressions comprises returning a payload that corresponds to the each Boolean expression when the expression is true to a user of the ecommerce website via an application program interface (API).

18. The electronic commerce system of claim 17, the evaluating further comprising:
receiving key facts comprising a plurality of key and value pairs;
determining a top-N Boolean expressions of a merged set of the first set and second set that are partially or fully satisfied by the received key facts, wherein the determined top-N Boolean expressions comprise at least one partially satisfied Boolean expression.

19. The electronic commerce system of claim 18, further comprising for each of the top-N Boolean expressions, returning payload and audit information.

20. The electronic commerce system of claim 17, wherein the index comprises partitions based on sizes of the Boolean expressions.

\* \* \* \* \*

UNITED STATES PATENT AND TRADEMARK OFFICE
CERTIFICATE OF CORRECTION

PATENT NO. : 10,769,696 B2  
APPLICATION NO. : 14/928346  
DATED : September 8, 2020  
INVENTOR(S) : Surana et al.

Page 1 of 1

It is certified that error appears in the above-identified patent and that said Letters Patent is hereby corrected as shown below:

In the Claims

In Column 14, Line 6, in Claim 17, delete "thea" and insert -- the --, therefor.

In Column 14, Line 17, in Claim 17, delete "thea" and insert -- the --, therefor.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*